Figure 1:
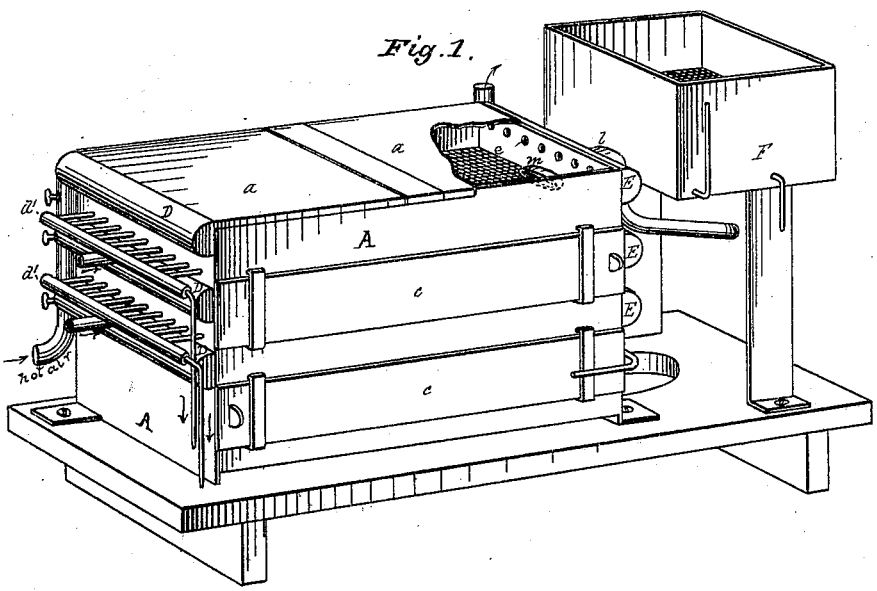

A. ROCK.
PRODUCTION AND TREATMENT OF RESIN.

No. 179,960.  Patented July 18, 1876.

Witnesses:
Philip F. Larner
A. B. Cauldwell

Inventor
Adolph Rock
By Wm. L. Wood atty.

UNITED STATES PATENT OFFICE.

ADOLPHE ROCK, OF NEW ORLEANS, LOUISIANA, ASSIGNOR OF ONE-HALF HIS RIGHT TO EDWARD VORSTER, OF SAME PLACE.

IMPROVEMENT IN PRODUCTION AND TREATMENT OF RESIN.

Specification forming part of Letters Patent No. 179,960, dated July 18, 1876; application filed November 17, 1875.

*To all whom it may concern:*

Be it known that I, ADOLPHE ROCK, of New Orleans, parish of Orleans, and State of Louisiana, have invented a certain new and useful Process of Distilling Turpentine, Manufacturing and Treating Resin, and Apparatus therefor; and I do hereby declare that the following specification, taken in connection with the drawings furnished and forming a part of the same, is a clear, true, and complete description thereof.

It is well known that in the art of distilling turpentine no apparatus is now considered as having practical value which, while effecting a complete and perfect distillation, performs that service without maintaining in the biproduct, or resin of commerce, those characteristics which are deemed of value to the consumer.

In the mercantile classification of naval stores, as generally accepted in the trade, resin is sampled in twelve grades, ranging in alphabetical order, (omitting J and L) from "A," black, to "N," extra pale. This latter is the highest and most valuable, and is of a bright, light color, transparent and free from extraneous matters. These extraneous matters, including chips and dirt, may be, and are sometimes, excluded from the resin by straining the crude turpentine prior to distillation; but it is the more common practice to strain the resin after it leaves the retort.

Crude turpentine may be properly classed as follows: First, "Virgin Dip," which flows from trees tapped for the first time, and then only for a period of about two months; second, "Virgin Scrap," which follows the dip, and is a similar exudation from the same new trees during the first year, solidified by exposure; third, "Old Dip," which is taken from the trees after the first year, before referred to, and which flows for a short time in the spring of each year; fourth, "Old Scrap," which is scraped from the old trees during the balance of the year, after the old dip has been gathered.

Under some circumstances, with apparatus heretofore in use, by the exercise of great care and skill, it has been possible to produce the high grades of resin from the virgin dip and scrap. It is seldom, however, that such resin grades higher than "Pale M," usually of grade "Low Pale K" and under. With the old dip and scrap, so far as my knowledge extends, these grades even have never been attained prior to my present invention. These higher grades are in great demand, and the supply from the native producers has long been insufficient to meet it, and, therefore, resins of low grade are shipped abroad, there treated under various refining and bleaching processes, and in the form of high grades are reshipped to this country to find a ready and profitable market.

These refining and bleaching processes involve the extensive use of alcohol and ether, which, being much cheaper abroad than in the United States, places the foreign refiners beyond the reach of domestic competition.

There is still another class of resins, sometimes called "boiled resins," which are neither black nor transparent, but are light-colored and opaque. This class has no grade in the market, but is usually sold at same rates as B and C of the regular grade. These resins contain water, and are the product of distilling operations, which involve the use of water or direct steam in considerable quantities, in contact with the crude turpentine. So far as my knowledge extends, prior to my invention resin of this class could not be freed from its water and produced in high grades except by the refining processes before referred to, involving the use of alcohol and ether. It has, however, with apparatus heretofore employed, been freed from water and produced in very low grades, seldom if ever higher than D or E.

Chemists have clearly demonstrated that pine resins derive their color from the presence of colopholic acid, and also that this acid is more or less developed in resin, according to the degree of heat to which the resin may have been subjected, and the period of its exposure thereto.

I have practically demonstrated that resin of grade N, if subjected to heat at about 185° Fahrenheit for about four hours, will fall in grade to I, which is next below K, or Low Pale, and this depression is wholly owing to the fact that the colopholic acid was thereby developed so far as to change the Extra Pale to one grade lower than Low Pale, and through continued exposure of this character it would be possible to reduce it as low as F or G. I have also demonstrated that, if the crude turpentine or the resin be but briefly exposed thereto, a high degree of heat may be safely employed, and that by intermittent exposure the volatile vapors may be wholly eliminated without developing the coloring-acid.

Unless the volatile spirits are wholly expelled good resin cannot be produced. These spirits are readily evolved at a temperature which will thoroughly melt the crude turpentine. At the melting-point, however, colopholic acid will be developed, provided the melted matter be long exposed to the melting-temperature; and it is, therefore, important that the distilling operation be performed by an intermittent exposure of the turpentine to a melting-heat, which has, as I believe, never been done prior to my invention.

The prime object of my invention is to produce a high grade of the bi-product, or resin, without any depreciation of spirits, either as to quality or quantity.

The main feature of my invention is an improvement in the art of distilling scrap-turpentine and producing rosin therefrom, which consists in the elimination of the condensable vapors from the scrap-turpentine treated in the retort during distinct and separate meltings or exposures of said matter to a melting-heat, succeeded in each instance by an exposure thereof to a cooler temperature, and in condensing the vapors, whereby the distillate is secured, and also whereby colopholic acid is prevented from being unduly developed in the rosin.

I have already explained that if the turpentine or the resin be subjected even to a melting-temperature for any considerable period the coloring-acid will be developed. In the pre-existing methods or processes relating to this art known to me, the crude scrap-turpentine is either melted prior to its introduction to the retort, or, by an older method, introduced in cold mass before the retort is heated. In both of these methods the melting-point is necessarily maintained for a period of time, which inevitably results in the development of an objectionable quantity of colopholic acid, and a consequent discoloration of the bi-product. By means of this, the main feature of my invention, the condensable vapors are eliminated while the matter is melted, and the undue development of colopholic acid prevented, because the matter is immediately thereafter exposed to a cooler temperature.

Another feature of my invention is an improvement in the art of distilling dip-turpentine and manufacturing rosin, which consists in the elimination of the condensable vapors from the dip-turpentine during the introduction of the dip into the retort in fine streams or in the form of spray during the injection of forced air-currents for conveying the vapors to a condenser, whereby the distillate is secured, while said dip is thoroughly exposed and promptly subjected to the degree of heat in the retort necessary to rapidly eliminate the vapors, without liability of developing the coloring-acid in the rosin.

I am aware that it has heretofore been proposed, in the process of distilling and refining petroleum-oils, turpentine, &c., to spray the fluids into a retort; but I am not aware that, in the distillation of crude dip-turpentine and the production of rosin, the dip was ever heretofore introduced into the retort in jets or in the form of spray during the injection of forced currents of air into the retort for conveying the vapors to the condenser.

Another feature of my invention is an improvement in the manufacture of rosin from poor scrap-turpentine, and in the treatment of boiled rosin, which consists in eliminating the aqueous and other vapors from said turpentine or rosin by means of currents of air sweeping over the turpentine or rosin while successively melted and cooled, whereby no portion of the rosin or turpentine is unduly-heated, and the undue development of colopholic acid prevented.

I am aware that it was proposed by one Williams, as set forth in English Patent No. 7,770, A. D. 1838, entitled "For purifying turpentine, resin, pitch," &c., to drive from bitumen, and from other matters mentioned in the title of said patent, "ammoniacal gas," and other gases "known to be injurious in the process of burning for the production of light and heat," by means of currents of atmospheric air brought into intimate contact with the bitumen while heated at or near the boiling-point in a pan, and during the alternate lifting of portions of said matter in a perforated pan or colander, and its discharge therefrom back to the pan. This process, as proposed by Williams, if applied to crude turpentine or rosin, would defeat the very object sought by me, in that the turpentine or rosin would, of necessity, be heated far above the melting-point, in order that it should have the requisite degree of fluidity to admit the use of the colanders. Moreover, the contents of the pan would, of necessity, have to be kept very hot, and at nearly the boiling-point, for a considerable length of time, in order that all the contents might be operated upon by repeatedly filling the colander and lifting it, so as to discharge into the pan.

I am also well aware that one Laffarge, as described in his French Letters Patent of May 14, 1855, proposed to use warm air for the manufacture of turpentine from resinous substances, or, more properly speaking, for the "perfect purification of spirits of turpentine without loss;" and that he proposed to employ for the purpose a chamber containing a sieve or filterer, a hot-air furnace, provided with air-heating pipes, over which atmospheric air passed, which, when heated, entered said chamber, and was laterally diffused by means of a deflecting-plate extended across the opening or air-entrance. Laffarge employed, also, an air-valve at an exit-aperture in the chamber, so adjusted as to maintain the hot air within the chamber at a uniform pressure. From the fact that Laffarge employed the deflecting-plate in front of the air-entrance, and between it and the sieve, for directing the incoming air laterally and vertically, and the fact that he had his air-exit guarded by a valve which only opened when a certain degree of pressure was attained in the chamber, and also from the fact that no pressure could be attained greater than that incident to the expansion of atmospheric air by the heat imparted thereto by the heating-pipes of the furnace, it is obvious that he did not employ currents of air, as used by me, for driving the aqueous and spirituous matters from crude turpentine or rosin while in a melted condition.

I am also aware that, in connection with the manufacture of sugar, certain evaporative apparatus has heretofore been proposed and employed, provided with extensive heated evaporative surfaces, and also with pipes for conducting air in jets to the evaporating-chamber, whereby the steam generated therein could be continuously driven therefrom, and thereby facilitate the evaporative process. In operating, however, with such evaporative apparatus, no valuable results could accrue through the intermittent heating and cooling of the fluids. On the contrary, a uniform temperature is preferable in all processes which are simply evaporative, while, in accordance with my invention, the intermittent heating and cooling of the crude turpentine and rosin prevents the injurious development of the colopholic acid.

I have already explained that when resin contains water it is called "boiled resin," is light-colored, opaque, has no specific grade in the market, and sells at a comparatively low price, and that, prior to my invention, it had never been so treated as to improve it to a high grade, except by refining processes involving the use of alcohol and ether. Under this last-stated feature of my invention such resin may be deprived of its water, because when it is melted the water rises to the surface, is evaporated by the hot-air blast, and driven from the retort.

The dip-turpentine owes its fluidity to the presence of the volatile spirit in large quantities; but it also contains a considerable quantity of water. The water, to whatever extent it exists, or whatever proportion it may bear to the turpentine, if retained in the resin, depreciates its value; for driving it off by direct contact with heat requires a temperature which unduly develops the colopholic acid. By the employment of an air-blast, at a temperature always preferably lower than melting-point, the water from the dip is taken up by evaporation and driven from the retort.

It is not new either to treat turpentine in retorts by means of radiating heat, or without the employment of water or steam in direct contact with the turpentine; but in all previous instances known to me, the condensable vapors are driven from such retorts purely by the expansion of those vapors incident to the effect of the heat applied thereto, and therefore, if the watery vapors are eliminated at all, it requires a high degree of heat, instead of the low heat of the air-blast and its evaporative action, as under my process.

I am aware, however, that it has heretofore been proposed to employ an exhaust air-pump in connection with a retort and condenser in the distillation of turpentine, for the purpose of distilling under what is termed the "vacuum process," and that by these means the operation could be conducted with a lower degree of heat in the retort than by the usual methods generally practiced.

In connection with the treatment of petroleum-oils, for depriving them of more or less of the volatile matters contained therein, I am aware that a high-temperature air-blast has been heretofore proposed for sweeping over the surface of the oil in the retort, and eliminating the volatile matters therefrom and driving them from the retort; but I am not aware that such a blast has ever been proposed in connection with the distillation of turpentine prior to my invention, or that an apparatus was ever made for operating on petroleum or other oils which would be capable of operating on turpentine without embodying in the retort features in construction and arrangement which constitute portions of my present invention.

There is a class of old trees which yield crude turpentine so deficient in volatile matter that it will not pay to work it for the spirits it would yield, nor with any pre-existing apparatus known to me can resin be made therefrom, except of the lowest grades, and therefore attempts to utilize it are seldom made. Under that portion of my invention last stated, resins of the higher grades may be profitably made from such turpentine, even if the condensable vapors be allowed to escape into the open air, instead of being conveyed to the condenser.

That portion of my invention which relates to the apparatus consists, first, in a retort for distilling turpentine, the combination of one or more skeletonized shelves, a discharging-apron below the shelves, and feeding-apertures provided with suitable covers, located in the shell of the retort adjacent to the shelves, whereby crude scrap-turpentine may be fed to the retort by placing it on said shelves, and also whereby the turpentine, as it is melted, may drip from one shelf to another, or to the apron, and during its descent be favorably exposed for parting with its volatile vapors;

second, in a retort for distilling turpentine, a discharging-apron and one or more skeletonized shelves, provided with internal heating flues or passages, in combination with air-induction passages and vapor-eduction passages, whereby aeriform currents, more or less heated, may be directed through the retort, over and between the shelves, and over the discharging-apron, thereby eliminating the condensable vapors from the turpentine on said shelves, and falling therefrom and driving them to a condenser; third, in combination with a retort for distilling turpentine, a skeletonized shelf, provided with interior heating-passages and a cloth filterer, whereby the crude turpentine is thoroughly filtered while in the retort during the elimination of its condensable vapors; fourth, the combination of one or more skeletonized shelves, provided with interior heating-passages and a filterer, a discharging-apron, and air-passages over and under the shelves, and over the apron, whereby old scrap-turpentine, containing but little volatile matter, may be made into resin of high grade.

To more particularly describe my invention I will refer to the accompanying drawings, in which—

Figure 2:
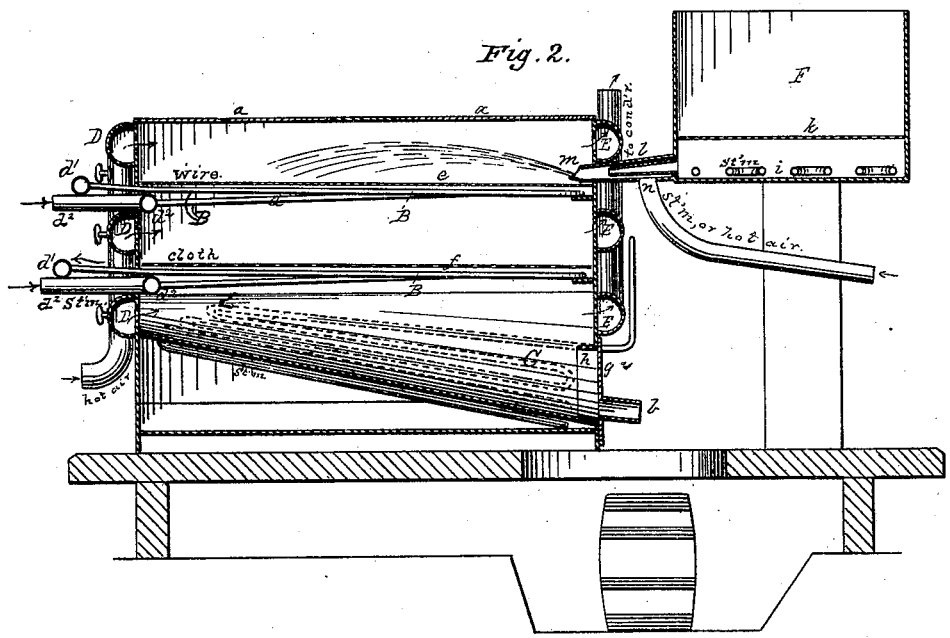

Figure 1 represents, in perspective, an apparatus embodying the several features of my invention. Fig. 2 represents the same in longitudinal vertical central section.

As my invention relates to the treatment of the turpentine and resin in the retort, I have not shown any condenser, and it will be understood that any suitable condensing apparatus may be employed therewith. Nor have I shown steam-boilers, fans, or air-heating apparatus, as such devices are well known, and may be readily and favorably selected by persons skilled in such matters.

My retort is shown at A. Its form may be varied; but I prefer that it be rectangular and box-like, as shown. It is preferably mainly constructed of wood, with or without a copper lining. Inasmuch as the resin is liable to injury from contact with iron, I prefer to use none of that metal in its construction, except it be coated with copper. The retort is provided at its top with close-fitting covers, as at $a$, which may be removed for introducing the matter to be treated. These covers should have seats, provided with a suitable packing for securing good joints. For convenience, I prefer that the retort should be so set that barrels may be placed beneath the discharge-aperture, as at $b$, for receiving the resin.

In order that free access may be had to the interior of the retort, I provide side openings with covers, as at $c$.

B denotes a skeletonized shelf, located within the retort, and extending from end to end and side to side. I prefer to construct it of numerous copper pipes, $d$, placed side by side, extending from one end of the retort to the other end, and back again in nearly the same plane, and communicating with larger pipes, as at $d^1$ and $d^2$, one of which is connected with a steam pipe and boiler, and through the other, as at $d^1$, the waters of condensation are discharged. In this instance I show two of these shelves. Under some circumstances one shelf will be able to perform the required service. Two shelves are, however, suited to general requirements, although an additional one may sometimes be employed.

Each shelf may be provided with a strainer, composed of wire-cloth or perforated metal, for removing the coarser chips and dirt usually found in the crude turpentine, although I show but one, as at $e$, in connection with the upper shelf. So, also, may each shelf be provided with a cloth filterer, although I show but one, as at $f$, on the lower shelf. This filterer is, preferably, composed of coarse cotton cloth, and is susceptible of retaining all those motes, &c., which should never be found in well-strained resin.

C denotes the discharging-apron. It is located at the bottom of the retort, is concave from side to side, and inclined downward from one end of the retort toward the discharge-aperture for the resin, as at $b$. Beneath the discharging-apron, and closely adjacent to its under surface, there is a steam-pipe extending longitudinally to and fro, whereby the apron may be kept at a desirable degree of heat.

The discharge-aperture $b$ is partially circular, and is guarded by a plate, as at $g$, which has a circular flange, as at $h$, extending laterally from its rear surface. The lower part of the adjacent end of the apron is curved, so as to receive the flange and afford a joint sufficiently close to prevent the escape of the soft resin. The plate $g$ is provided with a tubular spout, which may be closed, when desirable, by means of a plug.

D, in each instance, denotes one of three air-induction passages. They are located at one end of the retort, and communicate with the interior thereof by means of suitable open ports. Three of these passages are shown. The upper one delivers air into the retort above the upper shelf, the middle one between the two shelves, and the lower one between the lower shelf and the discharging-apron. These passages are connected with a pipe, from which they receive aeriform currents. These passages are connected with a supply flue or pipe, through which heated air may be driven by means of any suitable forcing apparatus. Each of these passages should be provided with a valve or cock, whereby the quantity of air admitted to the retort may be varied or cut off entirely to meet special requirements.

E, in each instance, denotes one of three vapor-eduction passages. They are located at the end of the retort opposite to the air-induction-passages, and are arranged in like manner with reference to the shelves and apron. The ports in these passages, which communicate with the interior of the retort, should have a somewhat larger aggregate of area than that of the air-induction ports. These several vapor-eduction passages are connected with a pipe, which conveys the vapors to a suitable condenser. (Not shown.)

F denotes a receiver for dip-turpentine. It is box-like in form, and has at its bottom a heating-coil, as at $i$, and a strainer, as at $k$, above the coil. The receiver is connected, at a point below the strainer, to the retort, above the upper shelf, by means of a pipe, $l$, which has within the retort a flattened or perforated nozzle or jet-pipe, as at $m$. This pipe is connected to another, as at $n$, which enters it at a point about midway between receiver and retort. The pipe $n$ is connected, preferably, with the device from which the supply of heated air is furnished to the air-induction passages, so that the turpentine may be injected into the retort through the jet-pipe in fine streams or spray. The pipe $n$ may, instead of containing a blast of air, be connected with a steam-boiler, and, by means of steam, effect the same purpose without endangering the resin by reason of the water of condensation, as will hereafter be fully described.

The strainer in the receiver is merely to prevent bulky extraneous matter from entering and clogging up the jet-pipe. The coil need only be used when the dip requires heat with a view to giving greater fluidity.

Instead of using the blast of steam or air for effecting the injection of the dip into the retort, a pump may be employed, which, operating directly upon the dip, will force it continuously or intermittently through the jet-pipe.

Having thus described a desirable form of apparatus in detail, I will say that the dimensions will be varied to meet requirements. The spaces between the shelves and above the apron may be varied from, say, six inches upward, and effect desirable results.

In explaining operations with such an apparatus I can only refer to the several general conditions under which it would, in practice, be operated.

In practice the quantity of scrap-turpentine to be treated largely exceeds the quantity of dip, and I will, therefore, first describe operations with the scrap.

For scrap-distillation but one wire strainer is used in the retort, and that is on the upper shelf. A single cloth filterer is used, which is located on the lower shelf. In charging the retort the upper covers $a$ are removed, and the upper shelf loaded with scrap to a depth preferably ranging, say, from six to twelve inches. The covers are then replaced, and the steam let into the pipes composing the shelves. The heat attained on these pipes need seldom, if ever, range higher than 185° Fahrenheit. The scrap in contact therewith melts and falls to the lower shelf upon the cloth filterer. The air-passages are opened, so that the currents will pass from one end of the retort to the other, above and below the shelves, carrying into the eduction-apertures the condensable vapors. The air thus introduced need seldom be of a temperature above 150° Fahrenheit. As the turpentine melts on the upper shelf the watery portions naturally rise to the top of the melted mass, or to the surfaces of the lumps, and are evaporated and carried to the condenser with the spirituous vapors. There is an extensive evaporative surface afforded at the upper shelf to the upper current, and as the turpentine trickles from one shelf to the other, and to the apron below, it is also favorably exposed for elimination of the spirituous matter. The cloth filterer on the second shelf so retards the passage of the melted matter that if water still be therein after passing the upper shelf, it will rise to the surface, and be evaporated by the current of air which sweeps over it.

It will be seen that the turpentine, leaving the upper shelf at, say, 185° Fahrenheit, in passing to the lower shelf, is exposed to a cooler temperature, and that it reaches the lower shelf below the melting-point, is then raised to melting-point, passed through the filterer to the apron below, being cooled in its descent in like manner, and on the apron again raised to the melting-point, and discharged thoroughly freed from the volatile matters contained in the crude turpentine. At no period of the process need the heat be raised to a degree which will unduly develop the colopholic acid, nor is it long exposed at any one time to even that degree of heat requisite to effect a favorable passage of the matter from shelf to shelf, and to the apron, and to eliminate all condensable vapors.

Under some circumstances, if the scrap be not over rich in spirituous matter, a single current of air may be relied upon for eliminating from the melted turpentine those matters, so thoroughly is the turpentine exposed to the air in the retort. In this case the discharge-aperture may be wholly opened for delivering the resin to the barrels. It is not to be understood that the air-currents need be always artificially heated, for during warm dry days the prevailing atmosphere may be successfully employed.

For operating on dip-turpentine the apparatus is adjusted somewhat differently—that is to say, instead of having a cloth filterer on one shelf only, I use one on each shelf. Coarse unbleached cotton cloth is preferred, of the same character as has for several years been employed in straining the resin after it leaves the retort. The dip is forced through the jet-pipe $m$, from the receiver F, into the retort above the upper shelf, and at its entrance is met by the current of air, which eliminates promptly a good proportion of the condensable vapors. The fluid falling upon the filterer is there held collected in mass to a greater or lesser extent. As before stated, the dip contains much water, and this, rising to the surface, is taken up by the air, by a purely evaporative process, and is carried to the condenser, where it is separated from the oily spirits, as heretofore. In trickling from the upper filterer to the one below, it is, as in the case of the scrap, exposed to a cooler temperature, then heated again on the lower shelf, and passes through its cloth filterer. As described in connection with the upper filterer, this last one affords a surface on which the remaining water is retained, which is evaporated as before. In falling to the apron below, it is again exposed to a current of air, cooled somewhat, and, on reaching the apron, is raised again in temperature until discharged therefrom. As the air is, in this case, employed between the apron and the lower shelf, it is desirable that the discharge-aperture be closed and the resin drawn off from time to time through the pipe or spout in plate $g$. In this last case the apron holds the resin in considerable quantity, completely guarding the discharge-aperture against the passage of vapors which should be conveyed to the condenser.

It will be seen that I can safely employ steam for assisting in the injection of the dip through the jet-pipe, because the water of condensation is thoroughly evaporated by the air-currents, and it cannot, therefore, injure the character of the resin.

In operating on dip, I prefer not to heat the upper shelf until a sufficient charge has been injected to, say, the depth of several inches on the shelf.

The cloth filterers are secured by tacking them to the sides and ends of the retort, or to a frame which snugly fits therein. So far as relates to the effectual separation of water from turpentine or resin, the cloth filterer performs an important service. It is clear that the water cannot freely pass through the cloth unless the latter be first saturated therewith. Being melted and quiescent, the resin or turpentine affords an opportunity for the water to rise to the surface, while the melted matter passes through the filterer. A small quantity of water will, however, pass with the melted matter through one filterer, if not previously so exposed that it may partially be removed, as in the case of the upper shelf already described in connection with the operations with scrap-turpentine. If a heavy woolen fabric be employed, a single filterer may in some cases be made to serve the purpose of two filterers composed of cotton cloth.

In treating that class of scrap which is too poor in spirituous matter to make it an object to preserve it, but having a value for making resin, the retort may be disconnected from the condenser, and the hot-air currents employed, so as to deliver the aqueous and other vapors directly into the open air; or, in dry, breezy weather, the artificially-induced currents may be dispensed with, the top and sides of the retort removed, and the surfaces of the shelves exposed to the air. In this latter case the heat of the shelves will secure a complete lateral circulation of air above and below them, and so effect the desired object.

In treating boiled resin in order to raise it, in grade, to a light-colored transparent condition, it is necessary to eliminate the water contained therein without employing such a temperature as will unduly develop colopholic acid. It has heretofore been proposed to perform this service by flowing the resin in a melted condition (previously ground and subjected to the bleaching action of chemicals) into a retort, and in so heating the melted matter as to drive off the water after first converting it into steam. It is clear that by this method a high degree of heat must be employed, at least to a degree which is required for converting the water into steam. Under this method no currents of air have been employed, and no circulation can be effected within the retort, and no air or vapor can leave it, unless forced therefrom by the expansion incident to the heat employed. I treat such resin in my retort by exposing it on the upper shelf, after the manner of treating the scrap; but, as it contains no spirituous matter of value, the watery vapors are discharged into the open air.

It will be seen that at no time during the operation is the resin exposed to a higher degree of heat than is necessary to melt it and allow it to fall from shelf to shelf, and to the apron, and to flow therefrom. The currents of air perform strictly an evaporative service in disposing of the water, and, not having been heated to a degree which could develop colopholic acid, and having been alternately heated and cooled in the retort and deprived of water, the product from the apron is bright, transparent, and of high grade. The cloth filterers in this connection, as assistants in the separation of the water from the resin, operate as before described.

When the weather is dry and breezy, the artificially-induced currents of air may be dispensed with by removing the top and side covers, and allowing a free circulation of the atmosphere between the shelves, as has already been suggested in connection with poor scrap.

It will be seen that I rely upon air as a vehicle for eliminating the condensable vapors, both aqueous and spirituous, and that the function performed by the air is therefore purely mechanical; and although in some instances it may be desirable to employ gases of a bleaching tendency instead of air, it is obvious that they would, nevertheless, serve as vehicles for the elimination and conveyance of the condensable vapors, and so perform the same service in the operation which would be performed by air.

It will also be seen that the construction of the retort may be largely varied without departing from the true spirit of my invention, and I therefore do not limit myself to any precise construction and arrangement of the several portions of the apparatus.

I am aware that the shelves might be provided with steam-chambers, be made of short length, and inclined alternately in opposite directions, so that the turpentine flowing over the upper shelf will, falling therefrom to the next below, pass along that to the next shelf, and so on to the discharging-apron. In such case the shelves, being short, and having frequent breaks between them, would operate as skeletonized shelves, which are provided solely so that the melted matter, in falling from one shelf to another, may be favorably exposed for the elimination therefrom of the condensable vapors.

Having thus described my invention, I claim as new—

1. The novel method of distilling scrap turpentine and producing rosin therefrom, which consists in the elimination of condensable vapors from scrap-turpentine while treated in a retort during distinct and separate meltings or exposures thereof to a melting-heat, followed in each instance by an exposure to a cooler temperature, and in condensing the vapors, substantially as described, whereby the distillate is secured, and also whereby colopholic acid is prevented from being unduly developed in the rosin, as set forth.

2. The improvement in the art of distilling dip-turpentine and manufacturing rosin, which consists in the elimination of condensable vapors from dip turpentine during its intermittent or continuous injection into a retort in fine streams or jets, or in the form of spray during the injection of forced air-currents for conveying the vapors to a condenser, substantially as described, whereby the distillate is secured, and also whereby the condensable vapors are eliminated at a low temperature, and the resinous residuum protected against the undue development of colopholic acid therein, as set forth.

3. The improvement in the manufacture of rosin from poor scrap-turpentine and in the treatment of boiled rosin, which consists in eliminating the aqueous and other vapors from said turpentine or rosin by means of currents of air sweeping over the turpentine or rosin while successively melted and cooled, substantially as described, whereby no portion of the rosin or turpentine is unduly heated, and the undue development of colopholic acid prevented, as set forth.

4. In a retort for distilling turpentine, the combination of one or more skeletonized shelves, a discharging-apron below the shelves, and feeding-apertures, provided with suitable covers, located in the shell of the retort adjacent to the shelves, substantially as described.

5. In a retort for distilling turpentine, a discharging-apron, and one or more skeletonized shelves, provided with internal heating flues or passages, in combination with air-induction passages and vapor-eduction passages, substantially as described.

6. The combination, with a retort for distilling turpentine, of a skeletonized shelf within the retort, provided with interior heating-passages and a cloth filterer, substantially as described.

7. The combination, with one or more skeletonized shelves, provided with interior heating-passages and a filterer, of a discharging-apron, and air-passages over and under the shelves and over the apron, substantially as described.

ADOLPHE ROCK.

Witnesses:
WM. C. WOOD,
PHILIP F. LARNER.